(12) United States Patent
Stogbauer et al.

(10) Patent No.: US 7,955,678 B2
(45) Date of Patent: Jun. 7, 2011

(54) HEAT-ACTIVATED PRESSURE-SENSITIVE LABELS

(75) Inventors: Christopher Paul Stogbauer, Merrill, WI (US); William Myles Reif, Wausau, WI (US)

(73) Assignee: Wausau Coated Products, Inc., Wausau, WI (US)

( * ) Notice: Subject to any disclaimer, the term of this patent is extended or adjusted under 35 U.S.C. 154(b) by 135 days.

(21) Appl. No.: 12/471,939

(22) Filed: May 26, 2009

(65) Prior Publication Data

US 2010/0300613 A1    Dec. 2, 2010

(51) Int. Cl.
| B32B 9/00 | (2006.01) |
| B32B 33/00 | (2006.01) |
| B32B 38/10 | (2006.01) |
| B32B 7/12 | (2006.01) |

(52) U.S. Cl. ............ 428/40.1; 428/40.5; 428/41.7; 428/41.8; 428/346; 428/354; 156/155; 156/153; 156/344

(58) Field of Classification Search .......... 428/40.1, 428/40.5, 41.3, 41.7, 41.8, 343, 346–348, 428/354; 156/153, 155, 344
See application file for complete search history.

(56) References Cited

U.S. PATENT DOCUMENTS

| 4,745,026 | A | 5/1988 | Tsukahara et al. |
| 5,292,713 | A | 3/1994 | Stenzel et al. |
| 5,508,247 | A | 4/1996 | Tran et al. |
| 5,569,515 | A | 10/1996 | Rice, II et al. |
| 5,763,354 | A | 6/1998 | Nagamoto |
| 5,840,657 | A | 11/1998 | Mehta et al. |
| 5,866,249 | A | 2/1999 | Yarusso et al. |
| 5,874,158 | A | 2/1999 | Ludwig et al. |
| 5,912,204 | A | 6/1999 | Yamada et al. |
| 6,043,190 | A | 3/2000 | Ichikawa et al. |
| 6,298,894 | B1 | 10/2001 | Nagamoto et al. |
| 6,383,631 | B1 | 5/2002 | Mehta |
| 6,388,692 | B1 | 5/2002 | Iwata et al. |
| 6,492,019 | B1 | 12/2002 | Shipston et al. |
| 6,500,536 | B1 | 12/2002 | Yamada et al. |
| 6,501,495 | B1 | 12/2002 | Ichikawa et al. |
| 6,731,319 | B2 | 5/2004 | Ichikawa et al. |
| 6,828,017 | B2 | 12/2004 | Kugo et al. |
| 2002/0064613 | A1 | 5/2002 | Kugo et al. |
| 2002/0119292 | A1 | 8/2002 | Venkatasanthanam et al. |
| 2003/0112311 | A1 | 6/2003 | Naik et al. |
| 2003/0175507 | A1 | 9/2003 | Ikeda et al. |
| 2004/0001931 | A1 | 1/2004 | Izzi et al. |
| 2004/0234756 | A1 | 11/2004 | Mathiaparanam et al. |
| 2004/0265573 | A1 | 12/2004 | Morita et al. |
| 2007/0252886 | A1 | 11/2007 | Sambongi et al. |
| 2007/0267146 | A1 | 11/2007 | Vigunas et al. |
| 2008/0220969 | A1 | 9/2008 | Matsunaga et al. |

*Primary Examiner* — Patricia L Nordmeyer
(74) *Attorney, Agent, or Firm* — Andrus, Sceales, Starke & Sawall, LLP

(57) ABSTRACT

A linerless pressure-sensitive label uses a heat-activated, non-tacky dead coat to cover a pressure sensitive substratum. Upon heat activation, the dead coat melts and admixes with an underlying pressure-sensitive adhesive substratum thereby resulting in an exposed pressure-sensitive adhesive. The label can then be applied to packaging or an end product by pressing the adhesive side of the label to the packaging or end product similar to a conventional pressure-sensitive label, however, no silicone-coated release liner is required. The elimination of the silicone-coated release liner results in lower material costs, lower shipping costs and less waste.

22 Claims, 2 Drawing Sheets

HEAT-ACTIVATED PRESSURE-SENSITIVE LABELS

FIELD OF THE INVENTION

The invention relates to heat-activated, pressure-sensitive labels and roll stock, and to methods of making and using the label stock.

BACKGROUND OF THE INVENTION

Pressure-sensitive label stock normally consists of a web of printable label material such as paper, film, foil or a combination of paper, film and/or foil, with an adhesive coated to the bottom side of the web, as well as a silicone-coated release liner covering the adhesive. The label is applied by peeling off the silicone-coated release liner and pressing the label to another surface. The adhesive is inherently tacky and forms a bond to the surface by the application of light pressure. The label can form a permanent bond or a removable bond dependent on the specific adhesive chosen.

Because conventional pressure-sensitive labels use a release liner, pressure-sensitive labels are relatively expensive and generate additional waste as compared to linerless labels. The primary object of the present invention is to eliminate the silicone-coated release liner, thereby resulting in significant waste reduction and printed label cost.

For industrial applications, pressure-sensitive label stock is typically supplied in rolls to label printing facilities. In most applications, the roll is loaded onto the front end of a roll label printing press. The label stock is fed from the roll through one or more printing stations and then one or more die cutting stations to print and cut the labels. In some applications, the continuous web is rewound for storage or shipment to a packaging facility. Sometimes the label stock is cut into sheets and/or individual labels which are stacked in magazines.

As mentioned, the pressure-sensitive label stock normally consists of a web of printable label material such as paper, film, foil or a combination of paper, film and/or foil, with an adhesive coated to the bottom side of the web, as well as a silicone-coated release liner covering the adhesive. The release liner is important to facilitate handling of the label stock and prevent "blocking" of the rolls or stacks of printed or unprinted label stock. In other words, when being stored in a roll or a stack, it is unacceptable for the various layers of the web to stick to one another; otherwise the layers tend to form a block which renders the label stock unusable. Most pressure-sensitive labels use a release liner for this purpose.

Before applying the label to packaging or an end product, the release liner must be removed in order to expose the pressure-sensitive adhesive. A common way in the art to accomplish this task automatically is to remove the pressure-sensitive labels from the web (or sheets of printed label stock) using equipment to peel the printed labels from the release liner and vacuum hold the label in place for application. The release liner as well as the other remaining portions of the web accumulate as waste which must be disposed. Once the labels are removed from the release liner, the labels are applied with light pressure to the packaging or end product by various means known in the art. As mentioned, eliminating the release liner from the pre-printed label stock provides the potential to substantially reduce the cost of producing pressure-sensitive label stock, while also substantially reducing shipping costs for shipping the pre-printed label stock from the production facility to the label printing facility. In addition, the absence of the release liner also reduces waste accumulation at the end user. Thus, the elimination of the release liner can provide a substantial cost savings at both the front end (production and printing) and the back end (label application).

Linerless pressure-sensitive label stock can be manufactured by applying a release coating (normally silicone) on the printing face of the printable web material, i.e., on the side of the web opposite to which the adhesive is applied. The resultant web can then be wound upon itself to form a roll, and then subsequently unrolled without the adhesive sticking to the other layers of the web. Such linerless label stock obviates the need for a separate release liner, however, is known in the art to suffer from several disadvantages. For example, the presence of a silicone release coating on the printable side of the web hinders the ability to print effectively with many inks. The release face of the linerless label typically has little or no porosity and therefore it is difficult for ink or toner to absorb and become anchored. Often, the printing can be wiped off or smeared upon contact.

The concept of a heat-activated, pressure-sensitive label stock has been discussed by others in the art in order to eliminate the need for the silicone release liner over the adhesive or a silicone release coating on the print face. See for example U.S. Pat. No. 4,745,026 by Tsukahara et al., issuing on May 17, 1988 and entitled "Thermal Delayed Tack Sheets"; or, U.S. Pat. No. 6,828,017 by Kugo et al. issuing on Dec. 7, 2004 and entitled "Heat-Sensitive Adhesive Material, Method of Preparing Same, and Method of Using Same." These patents generally disclose a homogenous heat-activated adhesive layer that includes an adhesive polymer and solid plasticizer particles mixed throughout, as well as selected other constituents.

It is important that a heat-activated, pressure-sensitive adhesive remain completely inert, such that it exhibits no properties of adhesion, until it is heated and activated just prior to its application to the end product. On the other hand, after heat activation, it is important that the resultant adhesive properties be suitable for the application process. Achieving an acceptable balance between these two properties has been proven to be difficult in the past. The above mentioned U.S. Pat. No. 6,828,017 suggests the incorporation of a super cooling improving agent in order to improve the thermal activation chemistry of the adhesive.

Another issue that has been difficult to address in the prior art is identification of a heat-activated adhesive mixture with an appropriate heat-activation temperature. If the required heat activation temperature is too high, the label itself may be damaged or difficult to use. On the other hand, the heat-activation temperature cannot be too low because the adhesive must remain inert under a wide range of conditions in which the label stock is expected to be stored and shipped. For example, the label stock must be able to maintain integrity on a warm day in warehouses or enclosed truck trailers that are not air conditioned.

Another approach to make a linerless pressure-sensitive label is explained in U.S. Pat. No. 5,569,515 by Rice, II et al. issuing on Oct. 29, 1996, and entitled "Printable Linerless Label and Method for Making the Same". This patent discloses the application of a continuous protective layer of polyethylene or amide wax overcoating the pressure-sensitive adhesive. The protective layer is removed (at least partially) prior to use in order to expose the underlying pressure-sensitive adhesive thereby enabling the label to be subsequently affixed to a surface. The patent explains that the protective coating can be removed by mechanical, chemical or electrochemical means, for example, UV light, ultrasound, corona discharged or knurled roller.

SUMMARY OF THE INVENTION

The present invention is directed to a linerless, heat-activated, pressure-sensitive label stock, and methods for making and using the label stock.

In one aspect, the invention is directed to labels and label stock comprising a printable label material, such as a web of paper label stock, film or foil or a composite. The top face of the label material is adapted to receive printing (preferably without a silicone release coating). A pressure-sensitive adhesive substratum is coated to the bottom face of the printable label material. A dead coat is applied over and completely covers the pressure-sensitive adhesive substratum, thereby not allowing the label stock to exhibit adhesive tackiness prior to heat activation. Prior to use, and during storage of the label stock, the dead coat provides a non-tacky, anti-blocking surface over the pressure sensitive adhesive substratum, thereby facilitating effective handling of the label stock. Upon heat activation, the dead coat melts and admixes with the adhesive substratum, thereby resulting in an exposed pressure-sensitive adhesive with a significant (preferably substantially indefinite) open time.

The dead coat comprises micronized plasticizer, preferably phthalates, contained within a dried liquid carrier. The preferred liquid carrier contains a binder for the micronized plasticizer combined with water and surfactants. The purpose of the liquid carrier is to functionally hold the solids of the dead coat layer in suspension to facilitate application over the adhesive substratum, and also maintain an even distribution of plasticizer particles throughout the dead coat. The preferred binder is ethylene acrylic acid. Surfactants are preferably added to the liquid carrier in order to promote complete coverage of the dead coat over the underlying adhesive substratum. The pressure-sensitive adhesive substratum is preferably a hot melt acrylic, or synthetic or natural hot melt rubber.

As mentioned, prior to heat activation, the dried dead coat covers the adhesive substratum without penetrating the adhesive substratum, and the label stock does not exhibit adhesive tackiness at room temperatures prior to heat activation. As heat is applied, the dead coat melts and the adhesive substratum softens. The plasticizers and the ethylene acrylic acid in the dead coat admix with the adhesive substratum thereby exposing the pressure-sensitive adhesive rendering the label ready for use.

It is important that a sufficient amount of the dead coat be applied in order to reliably cover the underlying adhesive substratum completely. On the other hand, the nature of the underlying pressure-sensitive adhesive is affected by the admixed plasticizer and ethylene acrylic acid. Therefore, providing too much dead coat can render the resulting pressure-sensitive adhesive less effective. It is preferred that the underlying adhesive substratum have a minimum coat weight of 6 lbs. per 3,300 feet squared, and that the dead coat have a coat weight of 2 to 12 lbs. per 3,300 feet squared. The specific recipe for an exemplary embodiment of the invention results in a reliable permanent pressure-sensitive adhesive after heat activation.

Preferably, the melting point for the dead coat should be no less than 120° F., and most preferably no less than 140° F. In an exemplary embodiment, the dead coat begins to melt at temperatures greater than about 145° F., whereas the hot melt adhesive substratum requires a temperature of greater than 220° F. to become flowable and receptive to the melted dead coat. Therefore, the heat activation temperature for this embodiment is at least about 220° F., although the label stock should not be stored at or above the melting temperature for the dead coat.

In another aspect of the invention, the invention relates to a method of making the heat-activated, pressure-sensitive label stock described above. In the method, a roll of label stock is provided to an adhesive application station, where the adhesive substratum is applied to one side of the web. The adhesive substratum is cooled, perhaps using an in-line chill drum, to solidify the adhesive substratum. Then, the water-based dead coat is coated over the solidified adhesive substratum. It is important that the dead coat fully cover the adhesive substratum. As mentioned above, the liquid carrier for the dead coat includes one or more surfactants to facilitate full coverage. Because the liquid carrier is water based, the dead coat requires substantial drying. The preferred method of drying the dead coat uses a hot air dryer at a low temperature with a high fan volume in order to maintain the temperature of the web below the melting temperature of the plasticizer and the dead coat. The web is then optionally chilled again. Once the dead coat is dried and chilled, the label stock is rewound into roll form.

To use the resulting label stock, the labels are printed and then cut or die cut. Heat is applied to melt the dead coat and facilitate admixture into the pressure-sensitive adhesive substratum to expose pressure-sensitive adhesive. The label is then applied to the package and/or end product by pressing the pressure-sensitive adhesive against the surface of the package or end product, as is known in the art. It is believed that a particularly advantageous application of the invention is its use in connection with stacks of individually printed and cut labels, although the invention may be useful in other applications as well (such as print and apply systems).

Other features of the invention should be apparent to those skilled in the art upon reviewing the following drawings and description thereof.

DETAILED DESCRIPTION

Figure 1:
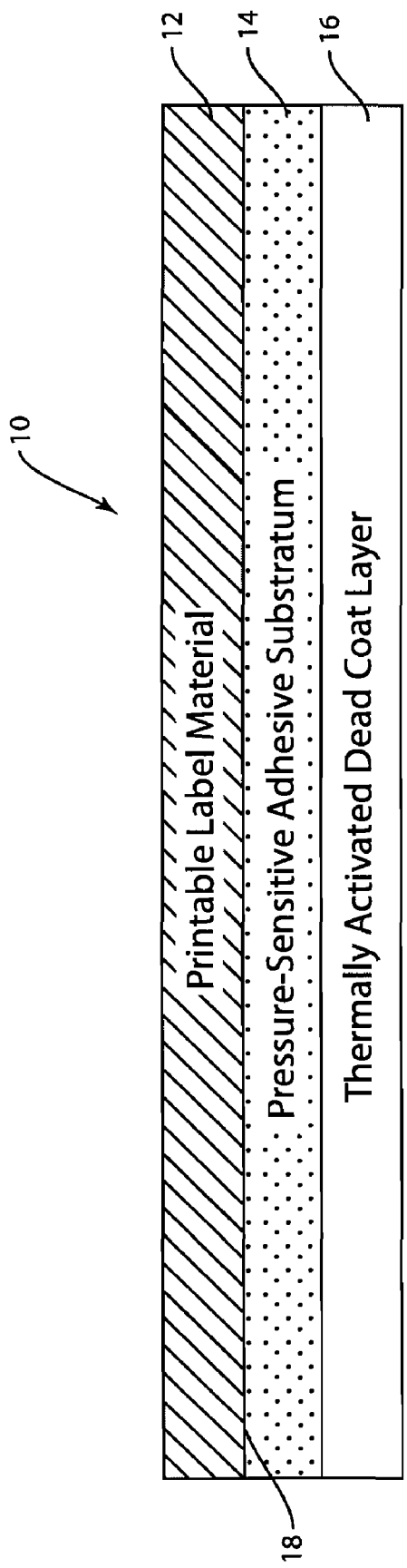
FIG. 1 is a schematic drawing illustrating the construction of a label stock manufactured in accordance with the preferred embodiment of the invention.

FIG. 1 illustrates the schematic cross-section of a heat-activated, pressure-sensitive label 10 manufactured in accordance with the preferred embodiment of the invention. The label 10 includes a web of printable label material 12, an underlying layer of pressure-sensitive adhesive substratum 14 coated onto a bottom side 18 of the printable label material 12, and a thermally activated dead coat layer 16 covering the pressure-sensitive adhesive substratum 14.

In accordance with the invention, the printable label material 12 is a label printing stock typically used in the art, for example, paper, synthetic continuous webs such as polyethylene, polypropylene, and polyester film, or other commonly used polymer webs, or foil laminates. In general, the invention is intended to be used in connection with a wide range of printable label materials which heretofore have been used to produce conventional pressure-sensitive labels having a silicone coated release liner or backing. In an exemplary embodiment described below, the printable label material is 50 lbs/ 3,300 ft2 CIS semi-gloss litho paper stock.

The pressure-sensitive adhesive layer 14 is preferably a hot melt acrylic pressure-sensitive adhesive, or a natural or synthetic hot melt pressure-sensitive rubber adhesive. These pressure-sensitive adhesives are commonly used in the art. In an exemplary embodiment, the pressure-sensitive adhesive substratum 14 is a synthetic hot melt pressure-sensitive adhesive. This adhesive is a relatively hard pressure-sensitive adhesive at room temperature. As is well known to those skilled in the art, the selected pressure-sensitive adhesive 14 must adhere reliably to the printable label material 12. Depending on the specific printable label material 12 and pressure-sensitive adhesive 14, it may be necessary to use a tie coat.

The pressure-sensitive adhesive substratum 14 in the exemplary embodiment softens at a temperature of about 220° F. While it embodies adhesive characteristics in its natural state at temperatures below 220° F., the pressure-sensitive adhesive is not receptive to mixing with the melted dead coat 16 until the pressure-sensitive adhesive substratum 14 reaches a sufficient temperature and softens.

The dead coat layer 16 completely covers the pressure-sensitive adhesive substratum 14. The dead coat 16 is applied as a water-based suspension and then dried so that the dried dead coat 16 completely covers the underlying pressure-sensitive adhesive substratum 14. The dead coat 16, as mentioned, provides a non-tacky, anti-blocking surface for the label stock 10 when the label stock 10 is stored at a temperature below the melting point of the dead coat 16. The preferred dead coat 16 comprises micronized plasticizer, preferably dicyclohexyl phthalate, although other phthalates or benzoates may be also suitable, depending on the application of the invention. In the exemplary embodiment of the invention described below, the micronized plasticizer is dicyclohexyl phthalate, having been ground to an approximate maximum particle size of 35-40 microns. The plasticizer particles are distributed throughout the dead coat layer 16. To apply the dead coat 16, the micronized plasticizer is mixed with a liquid carrier containing a binder, preferably ethylene acrylic acid, combined with water, a cross linker and a surfactant. In the exemplary embodiment described below, the surfactant is Ethoxylated 2,4,7,9-Tetramethyl 5 Decyn-4,7-Diol (sold under the trade name SURFYNOL®) and the cross linker is the zinc cross linking agent, zinc ammonium carbonate complex (sold under the trade name ZINPLEX 15). After the dead coat is dried, the binder, e.g. ethylene acrylic acid, and the other additives remain within the dried dead coat 16. The dead coat 16, and in particular the plasticizer within the dead coat 16, in the exemplary embodiment, has a melting temperature of about 145° F.

Figure 2:
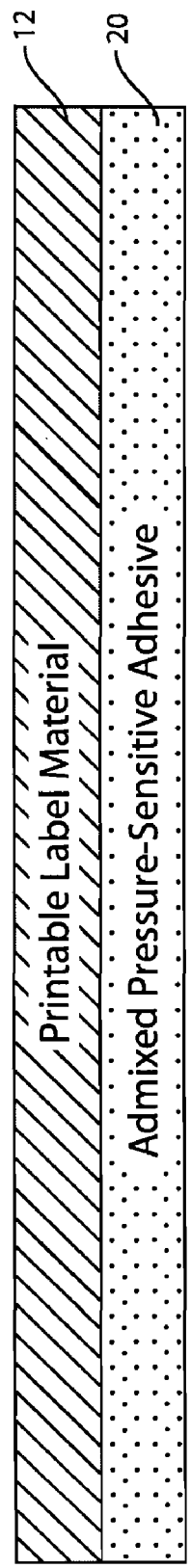
FIG. 2 is a schematic drawing illustrating the composition of the label illustrated in FIG. 1 after heat activation.

It has been found through testing that the above-described dead coat 16 completely masks the adhesive properties of the underlying pressure-sensitive adhesive substratum 14, as long as the dead coat 16 completely covers the pressure-sensitive adhesive substratum 14 and the label stock 10 is maintained at a suitable temperature and not exposed to excessive weight or pressure. Once sufficient heat is applied to the dead coat 16 and the pressure-sensitive adhesive substratum 14, the pressure-sensitive adhesive substratum 14 softens and becomes receptive to the melted dead coat 16. The melted dead coat 16 admixes with the pressure-sensitive adhesive substratum 14 to form an exposed pressure-sensitive adhesive 20, as illustrated in FIG. 2. The resulting adhesive properties of the exposed, admixed pressure-sensitive adhesive 20 depends not only on the adhesive properties of the original pressure-sensitive adhesive substratum 14, but also the relative amount and composition of the thermally activated dead coat layer 16. Based on testing, it has been found that the coat weight for the underlying adhesive substratum 14 should be a minimum 6 pounds per 3,300 feet squared, whereas the coat weight for the dead coat must be in the range of 2 to 12 pounds per 3,300 feet squared, depending, of course, on the nature of the specific pressure-sensitive adhesive substratum 14 that is used, the recipe for the dead coat 16, and the desired characteristics of the resulting exposed pressure-sensitive adhesive 20. It has also been found that the proportion of the ethylene acrylic acid binder to the micronized plasticizer must be optimized to ensure homogeneity of the dead coat 16, as too much ethylene acrylic acid binder destroys the ability of the dead coat 16 to admix. It has been found that a weight ratio of 3:1 of the micronized plasticizer to the ethylene acrylic acid binder results in an acceptable dead coat 16, whereas a ratio of 2:1 does not. The preferred proportion of plasticizer to binder is 9:1. Proportions between 3:1 and 12:1 are suitable.

In accordance with the invention, other additives can be added to the dead coat 16 and/or the pressure-sensitive adhesive substratum 14 in order to improve performance. For example, it may be desirable to add one or more solid tackifiers to the adhesive 14 in order to improve the adhesive performance of the exposed, admixture 20. Care must be taken that any additional additives do not interfere with the performance of the dead coat 16 to mask the underlying pressure-sensitive adhesive substratum 14 prior to heat activation.

EXAMPLE

Below is listed an exemplary embodiment of implementing the invention.

| | |
|---|---|
| Printable label stock | 50 lbs/3,300 ft² CIS semi-gloss litho paper stock |
| Pressure-sensitive adhesive substratum (14 lbs. per 3,300 ft²) | Hot Melt Rubber Permanent (Relatively High Shear) |
| Dead coat (4 lbs. per 3,300 ft²) | |
| micronized plasticizer (90 parts) | Dicyclohexyl phthalate having a max particle size of 35-40 microns |
| binder (10 parts) | Ethylene acrylic acid |
| surfactant (0.1 parts) | Ethoxylated 2,4,7,9-Tetramethyl 5 Decyn-4,7-Diol |
| cross linker (0.5 parts) | zinc ammonium carbonate complex |
| water (97.5 parts) | |

As mentioned, the pressure-sensitive adhesive substratum 14 listed above in the example is a relatively high shear pressure-sensitive adhesive in its normal state. When the above-described dead coat 16 melts and admixes with the heat-softened pressure-sensitive adhesive substratum 14, the resulting pressure-sensitive adhesive 20 has been found to be softer than the original substratum yet results in a reliable, permanent pressure-sensitive adhesive.

Figure 3:
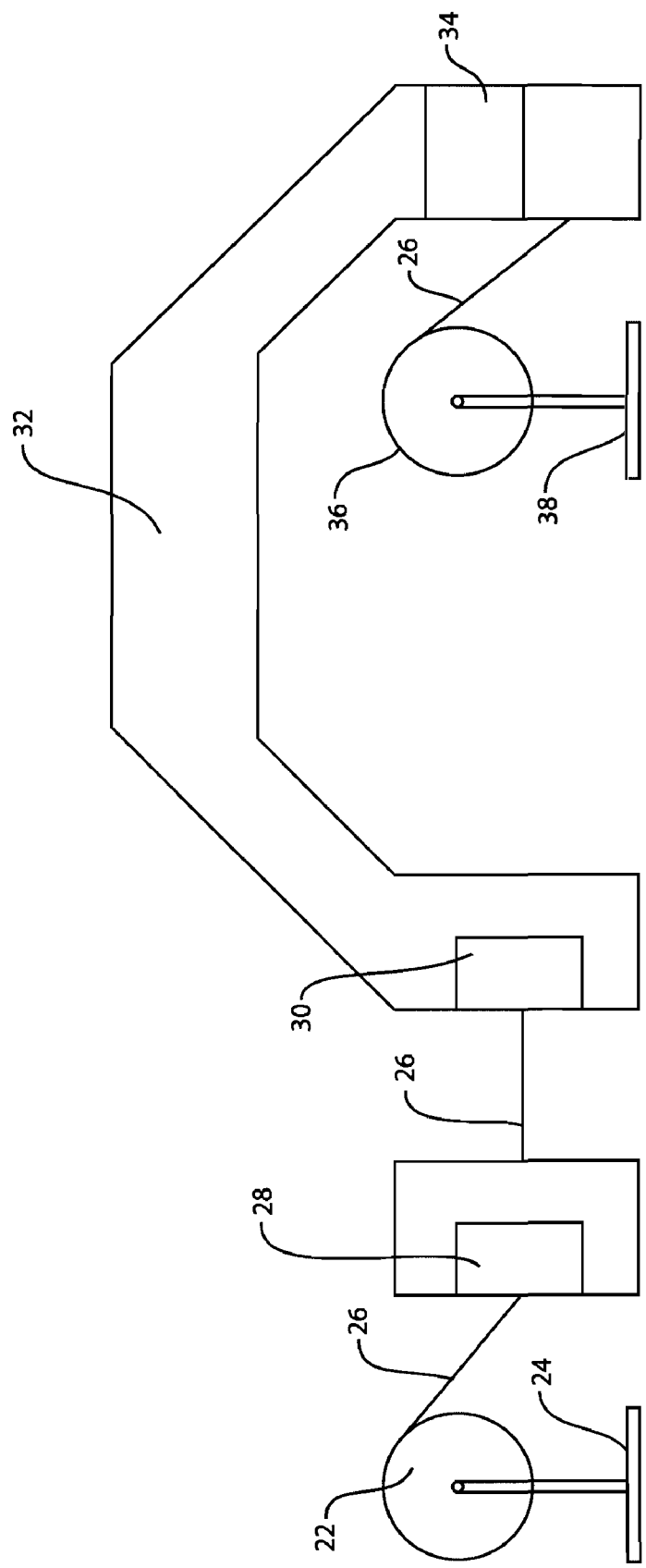
FIG. 3 is a schematic drawing illustrating the prefer manner of manufacturing the label stock illustrated in FIG. 1.

FIG. 3 illustrates a preferred manufacturing process for the heat-activated pressure-sensitive label roll stock 10 described above. In FIG. 3, a roll of conventional label stock 22 is provided on an unwind stand 24. A continuous web 26 of conventional label stock, e.g. paper label stock, is fed from the unwind roll 22 to a conventional adhesive applicator 28, which applies the hot melt adhesive substratum 14 to the bottom side of the continuous web 26. The pressure-sensitive adhesive substratum 14 is applied, using for example, roll coating, slot die or any other suitable method. Then, the web 26 is chilled, if necessary, using a chill drum in order to solidify the pressure-sensitive adhesive substratum 14 before applying the dead coat 16. From the adhesive applicator 28, the web 26 is fed to a coating station 30 which lays the water-based, thermally-activated dead coat layer 16 over the solidified adhesive substratum 14. It is important that the dead coat layer 16 be applied in such a manner that it reliably covers the entire surface of the solidified adhesive substratum 14. Preferably, the dead coat applicator 30 implements a Mayer rod technique, although gravure, roll coat or other techniques may be suitable. The Mayer rod technique is preferred because it is a rather gentle coating procedure which facilitates reliable application of the water-based dead coat without significant application pressure. The Mayer rod technique therefore results in robust coverage of the dead coat 16 over the underlying pressure-sensitive adhesive substratum 14.

The web 26 is then passed to a hot air dryer 32, which preferably dries the water-based dead coat layer 16 so that the water content of the web 26 is at least below 5% water, and preferably about 1-2% water. The hot air dryer 32 is preferably a low temperature system with a high volume fan. It is important that the web temperature be kept well below the melting temperature of the dead coat 16, and the plasticizer within the dead coat 16. For the exemplary embodiment, the web temperature is preferably maintained no greater than 135° F. The amount of air flow necessary to obtain sufficient drying depends on the web speed as well as the specific dimensions of the hot air dryer 32. From the hot air dryer 32, the web 26 passes to an optional chiller 34. The preferred chiller 34 is a chilled roller or drum similar to that used in connection with the adhesive applicator 28. The purpose of the downstream chiller 34 is to ensure that the dead coat is sufficiently solidified and cooled in order to stop potential blocking and migration of the dead coat layer into the pressure-sensitive adhesive substratum 14 prior to heat activation. From the chiller 34, the web 26 is wound into a roll 36 on rewind stand 38. The resulting roll 36 of linerless label stock is then slit, stored and/or shipped for use at a printing or packaging facility. It is best to store the roll 36 on its end in order to take the weight off of the interface between the dead coat 16, the underlying adhesive substratum 14 and the printable material 12. It is also preferred to store the roll at a temperature of 70° F. or below.

Printing can be applied to the print side of the label stock 10, 36 using conventional printing methods. Printed individual labels or sheets can then be cut or die cut from the roll 36. For example, the printed labels can be cut and placed into stacks of labels in magazines which are then transferred to a label applicator which may, for example, include a vacuum drum. Of course, once the labels are taken from the stack, the labels must be heated to not only melt the dead coat 16 but also render the underlying pressure-sensitive adhesive substratum 14 receptive to admixture of the dead coat 16 into the pressure-sensitive adhesive substratum 14. In the exemplary embodiment, that temperature has been found to be at least 220° F., preferably above 250° F. It has been found that upon heating to the activation temperature or above, the pressure-sensitive adhesive substratum 16 and dead coat 14 immediately mix and result in an exposed pressure-sensitive adhesive 20 that is suitable for long term use. Various heating techniques can be used, such as hot air, heated vacuum drum, or other heating techniques.

It will be apparent to those skilled in the art that various modifications and variations can be made to the invention and its construction without departing from the scope or spirit of the invention. Other embodiments of the invention will be apparent to those skilled in the art upon consideration of the specification and the practice of the invention, as disclosed and described herein. It is intended that the example given in the specification be considered as exemplary only, and that the true scope and spirit of the invention be indicated by the following claims.

What is claimed is:

1. A heat-activated, pressure-sensitive label stock comprising:
   a printable label material having a print face adapted to receive printing and a back surface adapted to receive pressure-sensitive adhesive;
   a layer of pressure-sensitive adhesive substratum applied to the back surface of the printable label material; and
   a dead coat completely covering the adhesive substratum, the dead coat providing a non-tacky, anti-blocking surface for the label stock when the dead coat is kept at a temperature below its melting point;
   wherein, upon heat activation, the dead coat melts and admixes with the adhesive substratum thereby resulting in an exposed pressure-sensitive adhesive with a significant open time.

2. A heat-activated pressure-sensitive label stock as recited in claim 1 wherein the dead coat comprises a micronized plasticizer within a liquid carrier.

3. A heat-activated pressure-sensitive label stock as recited in claim 2 wherein the liquid carrier comprises a binder combined with water and surfactants.

4. A heat-activated pressure-sensitive label stock as recited in claim 3 wherein the binder is ethylene acrylic acid.

5. A heat-activated pressure-sensitive label stock as recited in claim 2 wherein the micronized plasticizer comprises one or more of the following: phthalates.

6. A heat-activated, pressure-sensitive label stock as recited in claim 1 wherein the pressure-sensitive adhesive substratum is one or more of the following: hot melt rubber and hot melt acrylic.

7. A heat-activated, pressure-sensitive label stock as recited in claim 1 wherein the layer of pressure-sensitive adhesive substratum is applied at a minimum coat weight of 6 pounds per 3,300 feet squared, and the dead coat is applied at a coating weight of 2 to 12 pounds per 3,300 feet squared.

8. A heat-activated, pressure-sensitive label stock as recited in claim 1 wherein the melting point for the dead coat is not less than 120° F.

9. A heat-activated, pressure-sensitive label stock as recited in claim 1 wherein the adhesive substratum becomes receptive to the melted dead coat at a temperature above the melting temperature of the dead coat.

10. A heat-activated, pressure-sensitive label stock as recited in claim 1 wherein the exposed pressure-sensitive adhesive is a permanent adhesive.

11. A method using the heat-activated, pressure-sensitive label stock recited in claim 1 comprising the steps of:
    loading a roll of the label stock with the covered adhesive substratum layer and overlying the dead coat onto a printing press;
    printing labels on the print side of the label stock on the printing press;
    die cutting individual labels from the printed label stock;
    stacking the individual labels;
    applying heat to each individual label in order to melt the dead coat and expose pressure-sensitive adhesive; and
    applying the individual label to a package or end product by aligning the adhesive side of the label to the package or end product and applying pressure to the label against the package or end product.

12. A method using the heat-activated, pressure-sensitive label stock recited in claim 1 comprising the steps of:
   applying heat to each label in order to melt the dead coat and expose the pressure-sensitive adhesive; and
   applying the label to a package or end product by aligning the adhesive side of the label to the package or end product and applying pressure to the label against the package or end product.

13. A method as recited in claim 12 further comprising the steps of:
   loading a roll of label stock with the adhesive substratum layer and dead coat dried thereon onto a print and apply press;
   printing labels on the print side of the label stock on the print and apply press;
   cutting individual labels from the printed label stock using a fly knife or die cutting;
   wherein each of these steps is accomplished before applying heat to each label in order to melt the dead coat and expose the pressure-sensitive adhesive and then applying the label to a package or end product by aligning the adhesive side of the label to the package or end product and applying pressure to the label against the package or end product.

14. A method of making a heat-activated, pressure-sensitive label stock comprising the steps of:
   providing the web of label stock having a print side and a back side;
   applying a layer of pressure-sensitive adhesive substratum to the back side of the label stock;
   cooling the adhesive substratum to solidify the adhesive substratum on the back side of the label stock;
   applying a dead coat over the solidified adhesive substratum such that the dead coat covers the entire surface of the adhesive substratum coated on the back side of the label stock, said dead coat comprising a micronized plasticizer within a liquid carrier; and
   drying the dead coat layer on the label stock.

15. A method as recited in claim 14 wherein the dead coat is applied by one or more of the following methods: Mayer rod or roll coat.

16. A method as recited in claim 14 wherein the dead coat layer is dried by passing the label stock through a hot air drier such that the temperature of the web is maintained below the melting temperature of the dead coat.

17. A method as recited in claim 14 further comprising the step of chilling the label stock after passing the label stock through the hot air drier.

18. A method as recited in claim 14 further comprising the step of rewinding the label stock, with the solidified adhesive substratum layer and the dead coat dried thereon, in a roll for shipping.

19. A method as recited in claim 14 wherein the layer of adhesive substratum is applied at a minimum coat weight of 6 pounds per 3,300 feet squared, and the dead coat is applied at a coating weight of 2 to 12 pounds per 3,300 feet squared.

20. A method as recited in claim 14 wherein the liquid carrier comprises ethylene acrylic acid combined with water and surfactants.

21. A method as recited in claim 14 wherein the micronized plasticizer comprises one or more of the following: phthalates, and benzoates.

22. A method as recited in claim 14 wherein the adhesive substratum is one or more of the following: hot melt rubber and hot melt acrylic.

* * * * *